United States Patent
Walther et al.

(10) Patent No.: US 7,421,730 B2
(45) Date of Patent: Sep. 2, 2008

(54) MAINTAINING AUTHENTICATION STATES FOR RESOURCES ACCESSED IN A STATELESS ENVIRONMENT

(75) Inventors: Dan E. Walther, Bellevue, WA (US); Michael Kramer, Yonkers, NY (US); Anthony Y. Kueh, Issaquah, WA (US); Leszek Mazur, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1299 days.

(21) Appl. No.: 10/142,068

(22) Filed: May 9, 2002

(65) Prior Publication Data

US 2003/0212887 A1 Nov. 13, 2003

(51) Int. Cl.
*G06F 17/30* (2006.01)
(52) U.S. Cl. .............. 726/2; 726/5; 726/8; 713/151; 713/155; 713/156; 713/164; 713/168; 713/175; 713/182; 713/185; 709/223; 709/225; 709/229
(58) Field of Classification Search ............... 711/164; 709/255, 223, 225, 229; 726/2, 8, 5; 713/182, 713/185, 151, 168, 155–156, 164, 175
See application file for complete search history.

(56) References Cited

U.S. PATENT DOCUMENTS

| 5,875,296 | A |   | 2/1999 | Shi et al. ............ 395/188.01 |
| 6,161,139 | A | * | 12/2000 | Win et al. ............ 709/225 |
| 6,205,480 | B1 | * | 3/2001 | Broadhurst et al. ...... 709/225 |
| 6,324,648 | B1 |   | 11/2001 | Grantges, Jr. ............ 713/201 |
| 6,374,359 | B1 | * | 4/2002 | Shrader et al. ............ 726/5 |
| 6,421,768 | B1 | * | 7/2002 | Purpura .................. 711/164 |
| 6,763,468 | B2 | * | 7/2004 | Gupta et al. ............... 726/2 |
| 6,892,307 | B1 | * | 5/2005 | Wood et al. ............... 726/8 |

OTHER PUBLICATIONS

Burnt Offerings [Internet], B. Thomas, IEEE Internet Computing, Publ by. IEEE, USA, vol. 2, No. 6, Nov.-Dec. 1998, pp. 84-86.

* cited by examiner

*Primary Examiner*—Kimyen Vu
*Assistant Examiner*—Baotran N To
(74) *Attorney, Agent, or Firm*—Workman Nydegger

(57) ABSTRACT

A providing computer system may receive a request, via a stateless protocol, to access a resource. An access control application may refer to administrative rules to set validation information associated with the request. Validation information may be in the form of electronic text that is stored in a location such as a cookie or state-table. Validation information may indicate the state of a session associated with a resource, such as whether a session is in a logged-in or logged-out state. When a request is received, validation information and authentication information may be utilized together to determine if access to a resource should be granted. When access to a resource is granted or denied, validation information may be updated to indicate that the state of the session has changed.

34 Claims, 11 Drawing Sheets

|  | APPROPRIATE AUTHENTICATION INFORMATION | NOT APPROPRIATE AUTHENTICATION INFORMATION |
|---|---|---|
| VALIDATION INFORMATION INDICATIVE OF LOGGED-IN STATE | GRANT ACCESS | DENY ACCESS |
| VALIDATION INFORMATION INDICATIVE OF LOGGED-OUT STATE | DENY ACCESS | DENY ACCESS |

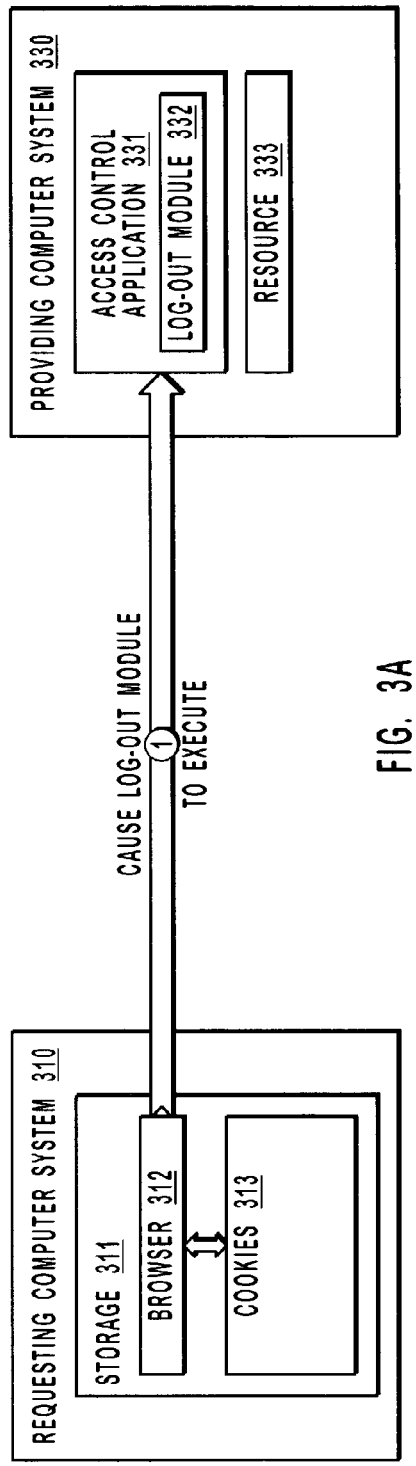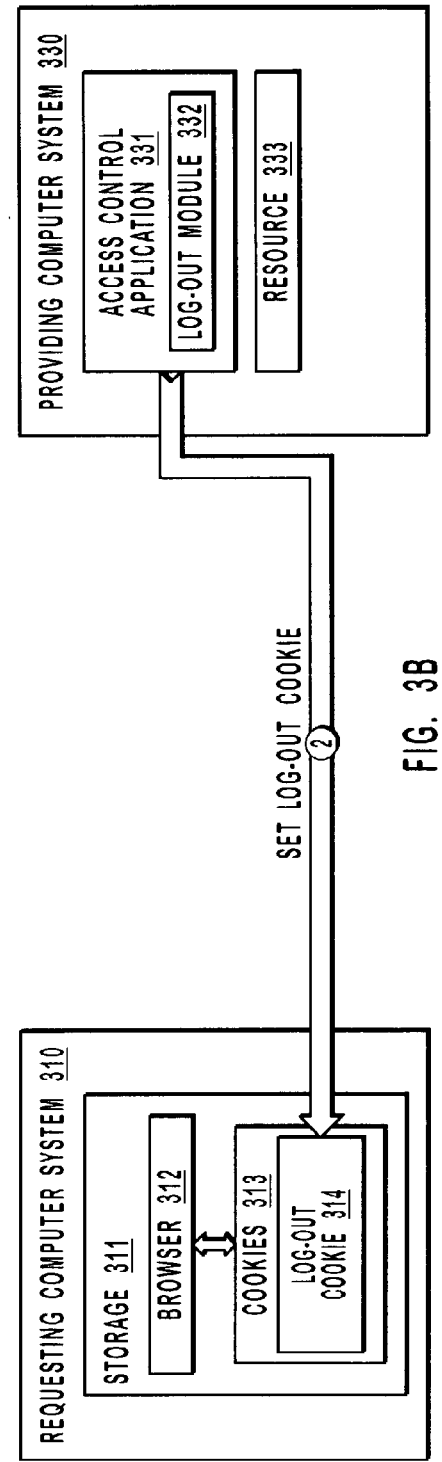

| ENTRANCE STATE | VALIDATION MODULE ACTION | EXIT STATE |
|---|---|---|
| NONE | SET COOKIE ACCORDING TO ADMINISTRATIVE RULES | VALID |
| VALID | ADMIT REQUEST | VALID |
| VALID | EXECUTE EXPRESS LOGOUT COMMAND AND SET LOG-OUT BEGIN COOKIE | VALIDATION BEGIN |
| VALID | DETECT EXPIRED COOKIE | VALIDATION BEGIN |
| VALIDATION BEGIN | REJECT REQUEST, SEND UNAUTHORIZED MESSAGE, AND SEND VALIDATION END COOKIE | VALIDATION END |
| VALIDATION END | ADMIT REQUEST | VALID |

FIG. 7

|  | APPROPRIATE AUTHENTICATION INFORMATION | NOT APPROPRIATE AUTHENTICATION INFORMATION |
|---|---|---|
| VALIDATION INFORMATION INDICATIVE OF LOGGED-IN STATE | GRANT ACCESS | DENY ACCESS |
| VALIDATION INFORMATION INDICATIVE OF LOGGED-OUT STATE | DENY ACCESS | DENY ACCESS |

FIG. 10

MAINTAINING AUTHENTICATION STATES FOR RESOURCES ACCESSED IN A STATELESS ENVIRONMENT

BACKGROUND OF THE INVENTION

1. The Field of the Invention

The present invention relates to maintaining authentication states for resources that are accessed in a stateless environment. More specifically, the present invention relates to systems, methods, and computer program products for validating user authentication information that is transported via stateless protocols.

2. Background and Relevant Art

Content on the World Wide Web ("WWW") is typically accessed in a client/server model. A "Web browser" of a client computer system sends a request to access content that is provided by a "Web Server" of a server computer system. If the user of the Web browser is authorized to access the content, the Web server typically provides the content to the Web browser.

Web browsers and Web servers include software modules that request, provide, and transport content, and that operate at various layers in the Open System Interconnection ("OSI") model. The OSI model defines one possible framework for implementing protocols in different functional layers. The OSI model breaks down the operations for communicating data into seven distinct "layers," each designated to perform certain operations in the data transfer process. Although the communication frameworks that have actually been implemented do vary somewhat from this model, referring to the OSI model is useful for understanding basic data communication.

Typically, the top layers of the OSI model are implemented by application software, while the lower layers of the OSI model are relegated to the operating system. The top-most layer is the application layer, which is typically responsible for supporting applications and end-user processes. When data is sent from a computer system, the data typically originates from the application layer, is passed down through lower layers, and enters onto a physical network. Likewise, when data is received at a computer system, the data enters from a physical network, is passed up through lower layers, and is transferred to the application layer.

In a Web environment, content and requests for content, are frequently transported using Hypertext Transfer Protocol ("HTTP"). HTTP operates between the application layer and other lower layers of the OSI model to facilitate the transfer of content in a Web environment. A request to access content typically originates from a user at a Web browser. The request is then converted to HTTP, passed through lower layers of the OSI model, and sent from the browser client computer system across a network. The request is received at a server computer system that includes a Web server, passed through the lower layers of the OSI model, and then converted to HTTP. After being converted to HTTP, the Web server may process the request to determine if the user of the Web browser is authorized to access the requested content. If the user is authorized to access the requested content, the Web server will transport the content back to the Web browser via HTTP in a manner similar to how the request was transported.

HTTP is a stateless protocol. In other words, communication via HTTP (e.g., a Web page request) is performed without knowledge of any previous communication (e.g., other previous Web page requests). As such, HTTP authentication does not support the concept of a "session" where a user would "log-in" or "log-out." Each request to access content that is transported via HTTP (hereinafter called "an HTTP request") must include appropriate HTTP authentication information.

The HTTP protocol provides for this authentication information to be supplied with each HTTP request via a special header called the WWW-Authorization header. This authorization header is of the format "WWW-Authorization: [Authentication-Type] [Credentials]." The way the browser obtains and transmits these credentials is as follows: The first time a user tries to access a web site which requires authentication, the web server will refuse to provide the requested content and will return to the browser an HTTP Error message number 401—Unauthorized, and this response contains a header line with the text: "WWW-Authenticate: [realm] [Authentication methods supported] [Optional information]".

When the browser receives this message it pops up a dialog box, which requests the user's name and password. After the user types in a correct password, the browser retransmits the original HTTP request to the server but it adds the HTTP "WWW-Authorization" header that now includes the credentials as an argument of the header label. If the Web server accepts the included credentials and returns valid content, the browser caches these credentials and retransmits them with each new request to this same Uniform Resource Locator ("URL") or derivative relative URL's associated with the same content.

The storage of user credentials in browser memory presents at least one potential security risk. Web browsers collect credentials and usually store them in cache memory indefinitely until a browser program is made to exit (by quitting the browser program or re-booting or turning off the computer (client device)). Thus, the credentials of a user who accessed protected content may be stored in cache memory of a browser even after the user is no longer using the browser.

This may be especially problematic in locations that have public computers. A privileged user may access protected content (content requiring credentials to access) through a browser contained in a public computer or client device (e.g., a public Kiosk). As a result of accessing the protected content, the privileged user's credentials are cached in browser memory. If the privileged user then steps away from the public computer, a non-privileged user may come along and use the browser's back-button or history feature to access the protected content. The non-privileged user would be able to access the protected content because the browser would retransmit cached credentials when the non-privileged user visits a URL that the privileged user previously visited.

Similar risks also apply to portable devices, such as, for example, mobile telephones or personal digital assistants, with Web browsers. For example, a non-privileged user might find a mobile device that contains a currently active Web browse (i.e., the portable device is turned on). The non-privileged user may be able to access protected content on the portable device by visiting a URL that causes the Web browser to retransmit cached credentials of the owner of the portable device.

In most public computers and portable devices that contain Web browsers, there is no easy way for a user to remove their credentials from the Web browser cache. Even if it is possible to remove credentials from memory (such as powering off the device or exiting the browser) a user may forget to remove their credentials when they are finished using a Web browser. Thus, it is necessary to provide some level of security to mitigate the effects of a user forgetting to remove their credentials.

The most secure method of using credentials would be for a browser to require users to manually re-enter authentication information for each HTTP request to access content. However, a typical interaction with a Web site could consist of tens or hundreds of HTTP requests. Thus, reentering credentials for each HTTP request would significantly increase the amount of time needed to access content and may be annoying to users.

Due to the danger of persisting HTTP authentication information stored in browsers, some content provider modules may implement their own application layer log-in state. For example, a Web page may control access to itself using application layer authentication, as opposed to allowing a Web server to control access to the Web page using HTTP authentication. This is often done by a content provider module introducing a "forms-based" log-in where a user manually enters content provider authentication information instead of HTTP authentication information. When a user is successful at logging-in, the content provider module, as opposed to the Web server, sends a logged-in cookie to a Web browser. Every time a new request is received, the content provider module checks the logged-in cookie. If the content provider module senses the logged-in cookie, the content provider module realizes that the user of the Web browser is logged-in.

Such content provider modules may also implement their own application layer log-out state. In response to a user clicking on a log-out link, the content provider module unsets, or deletes, the logged-in cookie from the Web browser. A content provider may also replace the logged-in cookie with a logged-out cookie. When the next request comes into the content provider module, the content provider module senses that a user is logged-out and refuses to provide content to the Web browser. The only way for a new user to gain access is to manually complete the forms-based log-in.

Thus, the conventional method for solving the problem of cached HTTP authentication information is to not use HTTP authentication at all, but to introduce application-based authentication session management using Application Forms to prompt a user for authentication information, and to store this information in "cookies." Cookies are small text files that include information about a Web browser, such as a user name and password associated with a user of the Web browser. The first time the browser requests content from the application, the application sends a form to the user requesting the user's name and password. The application then authenticates the user, and if this authentication is successful, the application will encode a cookie with a validated (time stamped) "admission ticket" which is usually good for that one session. The cookie is associated with the requested content and the Web server sends the cookie back to the Web browser where the cookie is stored. In subsequent requests to access the requested content, the authentication information included in the cookie (i.e. the admission ticket) is automatically transmitted to the Web server. Thus, if a user frequently accesses the same content, the user does not have to manually reenter the authentication information each time the same content is accessed.

While application level session management provides more secure access to content, through the use of logged-in and logged-out cookies, it is also cumbersome to a content provider module that employs such a scheme. It requires a content provider module to manage a separate authentication infrastructure, including the management of specialized access cookies. This is problematic for at least two reasons. Web servers or proxy servers typically control access to content at the HTTP level, while allowing content provider modules to focus on the management and delivery of content. Consuming the resources of a content provider module for session management leaves a reduced amount of resources for providing content. Also, HTTP authentication is well integrated into a variety of operating systems. However, a separate authentication infrastructure, such as one managed by a content provider module, may require significant coding modifications for compatible operation with the variety of operating systems.

Some content provider modules have found solutions to the danger of persisting HTTP authentication information stored in cookies without resorting to application layer session management. In one mechanism, a log-out action of a user may result in an exit signal back to a Web browser, which causes the Web browser to drop all cached user-ids and passwords that may be stored in cookies. Another mechanism causes a script to run on a client computer system. The script utilizes a proprietary Web browser Application Program Interface ("API") to clear cached credentials, such as those contained in a cookie. However, these mechanisms are Web browser dependent and a Web browser may require modification to ensure compatibility with these mechanisms. Moreover, these mechanisms do not address the needs of devices that include Web browsers that never exit or do not include the proprietary APIs. For example, many cell phone based Web browsers never exit and do not include the capability to run scripts.

Therefore, what are desired are systems, methods, and computer program products for maintaining authentication states for resources that are accessed via stateless protocols, wherein the systems, methods, and computer program products utilize the authentication mechanisms included in the stateless protocols.

BRIEF SUMMARY OF THE INVENTION

Methods, systems, and computer program products are described for maintaining authentication states for resources that are accessed using stateless protocols, such as HyperText Transfer Protocol ("HTTP"). Authentication states are maintained through the novel use of validation information, which supplements authentication mechanisms inherent in the stateless HTTP protocol. Maintaining authentication states in accordance with the present invention does not require a separate authentication infrastructure or proprietary browser modifications.

A request is received to access a resource that requires authentication. This may include a Web server receiving a request from a Web browser. A request may be for content (e.g., a Web page) that is included in a network (e.g., the Internet). Such a request may be transported via any stateless protocol including HTTP, Wireless Transfer Protocol ("WTP"), Wireless Access Protocol ("WAP"), and Session Initiation Protocol ("SIP"). Authentication information may be included in a header (e.g., a "WWW-Authenticate" header in the case of HTTP) that is associated with the request.

Validation information is added to the request and is subsequently used along with the authentication information to determine whether access to the resource should be granted. Validation information may be stored in a cookie and transmitted along with authentication information when a Web browser sends a request. Alternatively, validation information associated with a resource may be indexed via a cookie identifier and stored in a state-table. In the latter alternative, when a request to access a resource is sent or received, validation information associated with the resource may be retrieved from the state-table.

In some instances, a request to access a resource that requires authentication information may be a request to access a resource that the Web browser user has not previously accessed using the browser. This initial request to access a resource associated with a session that is currently in a "logged-out" state by default.

When receiving the initial request to access a resource that is in a logged-out state, the resource host may refer to administrative rules to determine what validation information needs to be associated with the request in order for authentication to be successful. In some circumstances (e.g., when a previous user of the same Web browser logged out of the resource or when the time stamped cookie of the current user has timed out), the administrative rules may dictate that the session be returned to the logged-out state. The mechanism for the validation module to set the logged-out state is either the removal of the cookie entirely, or the setting of a "validation begin", cookie. A validation begin cookie is a cookie that contains information that, when received back at the Web server, results in initiation (or re-initiation) of the authentication process. The validation module will send a form to the user and prompt for user credentials. The user fills out the form and the validation module attempts to authenticate these credentials. If the authentication process is successful, then the validation module will set a "logged-in" state by setting a "logged-in" validation cookie.

The web server validation module may determine that a user has entered the logged-out state if the validation cookie contains a time stamped cookie that has expired. As previously described, the validation module should remove the cookie or set the cookie to "validation begin" and redirect the user to the authentication form.

If a request to access a resource does not include appropriate validation information (e.g., if the request includes validation information from a validation begin cookie), the request may be rejected. Rejecting a request may occur even if the HTTP authentication information included in the request is correct and would otherwise result in access to the resource being granted.

When a request to access a resource is rejected, an unauthorized message may be sent from the validation module to a requesting computer system signifying that the request is being rejected or that the user is unauthorized. The validation module may also send a form in which the user can re-enter their authentication information. Such a form may be under the control of the validation module (and not HTTP) thereby essentially eliminating any chance of previously cached credentials being sent from the requesting computer system to the validation module. After sending this rejection message and receiving valid re-authentication credentials from the user, the validation module may update the session validation information in the cookie or associated with the cookie. In some embodiments, a validation module may compare credentials that are entered into a form to the credentials contained in a WWW-Authorization header of an HTTP request. This may relieve the validation module from having to contact an authentication database.

Updated validation information may be an updated validation cookie that is sent to the requesting computer system to replace a current validation cookie. For example, a "validation end" cookie may replace a validation begin cookie. The validation end cookie includes information that, when received back at the Web server, results in recognizing the session as being in a logged-in state. Alternatively, validation information may be updated by updating a validation statetable. If the re-authentication credentials were found to be invalid, the updated validation information may include information that indicates an unauthorized message was returned to the requesting computer system when a first request was rejected.

When subsequent requests are made for the resource, validation information along with HTTP authentication information is again used to determine if access to the resource should be granted. If a request to access a resource is associated with appropriate validation information and includes appropriate authentication information, access to the resource is granted.

Through utilizing updateable validation information, session states may be maintained while continuing to use authentication mechanisms inherent to stateless protocols. Validation information is used to indicate that a user of a Web browser has manually re-entered authentication information and/or that the authentication information cached by a browser has been actively re-entered. This increases the level of security when accessing resources that require authentication information, and helps assure that user credentials, although cached by a browser, will be usable for only a short period of time and will need to be re-verified to continue to be used. Additionally, application developers may devote fewer resources to managing authentication processes.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3A illustrates an example of some of the functional components that may facilitate executing an express log-out function.

FIG. 3B illustrates an example of some of the functional components that may facilitate setting a log-out cookie

FIG. 7 illustrates an example of a state table that includes states that may be maintained for resources accessed via a stateless protocol.

FIG. 10 is an example of a chart illustrating a relationship between authentication information and validation information.

DETAILED DESCRIPTION OF THE PREFERRED EMBODIMENTS

Figure 1:
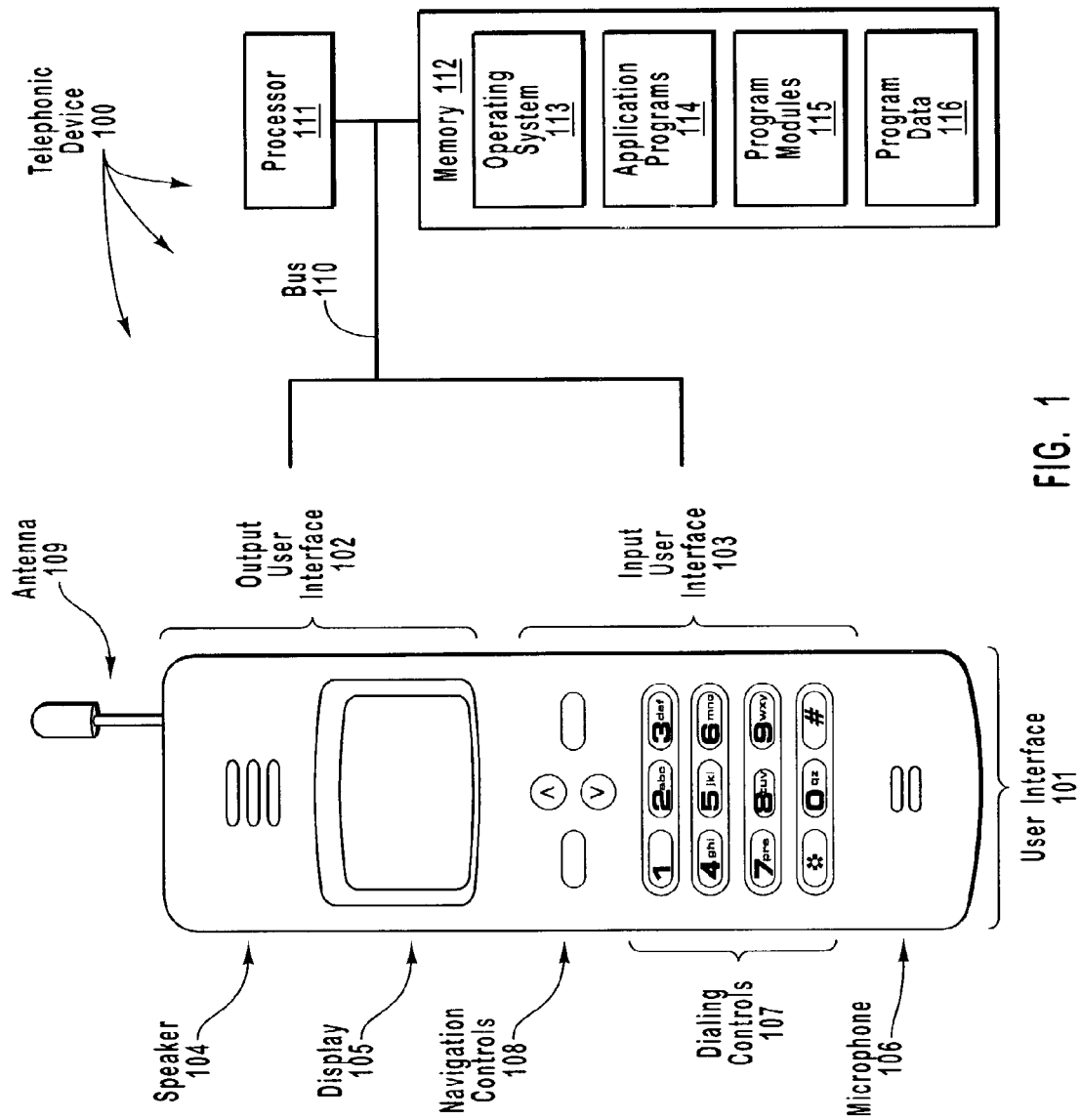
FIG. 1 illustrates an example of a telephonic device that provides a suitable operating environment for the present invention.

The present invention extends to systems, methods, and computer program products for maintaining authentication states for resources accessed via stateless protocols. Validation information is used to supplement authentication information transported via a stateless protocol when determining if access to a resource should be granted. If either the validation information or the authentication information associated with a request is not appropriate for accessing a resource, access to the resource is denied. However, if both the validation information and the authentication information associated with a request are appropriate for accessing a resource, access to the resource may be granted.

In operation, validation information included in supplemental cookies or a state-table may be utilized to determine the state of a resource at a providing computer system with respect to a browser at a requesting computer system. If validation information indicates that a resource is associated with a session in a "logged-out" with respect to the browser, a user of the browser may be denied access to the resource When access to a resource is denied, the providing computer system (e.g. a Web server) may provide a form that prompts the user to manually re-enter authentication information. In subsequent browser requests to access the same resource, validation information may indicate to the providing computer system that authentication information was manually re-entered.

Embodiments of the present invention may comprise a general-purpose or special-purpose computer system including various computer hardware components, which are discussed in greater detail below. Embodiments within the scope of the present invention also include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions or data structures and which may be accessed by a general-purpose or special-purpose computer system.

When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a computer network. Likewise, a computer system may include a single physical device (such as a mobile phone or Personal Digital Assistant "PDA") where internal modules (such as a memory and processor) work together to perform operations on electronic data.

Those skilled in the art will appreciate that the invention may be practiced in network computing environments with many types of computer system configurations, including, processor-controlled kiosks, personal computers, laptop computer, hand-held devices, multi-processor systems, microprocessor-based or programmable consumer electronics, network PCs, minicomputers, mainframe computers, mobile telephones, PDAs, pagers, and the like. The invention may also be practiced in distributed computing environments where local and remote computer systems, which are linked (either by hardwired links, wireless links, or by a combination of hardwired or wireless links) through a communication network, both perform tasks. In a distributed computing environment, program modules may be located in both local and remote memory storage devices.

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing steps of the methods disclosed herein. The particular sequences of such executable instructions or associated data structures represent examples of corresponding acts for implementing the functions described in such steps.

With reference to FIG. 1, a suitable operating environment for the principles of the invention includes a general-purpose computer system in the form of a telephonic device 100. The telephonic device 100 includes a user interface 101 for allowing a user to input information through an input user interface 103, and to review information presented via an output user interface 102. For example, the output user interface 102 includes a speaker 104 for presenting audio information to the user, as well as a display 105 for presenting visual information to the user. The telephonic device 100 may also have an antenna 109 if the telephonic device 100 has wireless capabilities.

The input user interface 103 may include a microphone 106 for translating audio information into electronic form. In addition, the input user interface 103 includes dialing controls 107 represented by twelve buttons through which a user may enter information. Input user interface 103 also includes navigation control buttons 108 that assist the user in navigating through various entries and options listed on display 105.

Although user interface 101 has the appearance of a mobile telephone, the unseen features of user interface 101 may allow for complex and flexible general-purpose processing capabilities. For example, telephonic device 100 also includes a processor 111 and a memory 112 that are connected to each other and to the user interface 101 via a bus 110. Memory 112 generally represents a wide variety of volatile and/or non-volatile memories and may include types of memory previously discussed. However, the particular type of memory used in telephonic device 100 is not important to the present invention. Telephonic device 100 may also include physical storage media (not shown) similar to those associated with other general-purpose computer systems.

Program code means comprising one or more program modules may be stored in memory 112 or other storage devices as previously mentioned. The one or more program modules may include an operating system 113, one or more application programs 114, other program modules 115, and program data 116.

While FIG. 1 represents a suitable operating environment for the present invention, the principles of the present invention may be employed in any system that is capable of, with suitable modification if necessary, implementing the principles of the present invention. The environment illustrated in FIG. 1 is illustrative only and by no means represents even a small portion of the wide variety of environments in which the principles of the present invention may be implemented.

In this description and in the following claims, a "providing computer system" is defined as a computer system that may receive requests to access resources and, if access is granted to a resource, may provide the resource to a requesting computer system. An example of a providing computer system is a computer system that includes a Web server that is capable of providing content to Web browsers.

In this description and in the following claims, a "requesting computer system" is defined as a computer system that may send requests to access resources to a providing computer system and may present accessed resources to a user. An example of a requesting computer system is a computer system that includes a Web browser that may send requests to a Web server.

It should be understood that a computer system might be both a providing and a requesting computer system. That is, a computer system may receive requests and determine if access should be granted to some resources and may also send requests and present the requested resources to a user.

In this description and in the following claims, "authentication information" is defined as information inherent to a protocol's (e.g. HTTP) access control mechanisms. Authentication information often includes user identifiers and passwords used by a protocol to determine if access to a resource should be granted. Authentication information may, for example, be included in protocol headers and transported between computer systems.

In this description and in the following claims, a "validation state" is defined as the state of a session with respect to a resource. A validation state may be a "logged-in" state, "logged-out" state, "valid" state, "validation begin" state, "validation-end" state, or any other state that designates a relationship between a session and a resource. A validation state may be determinative of whether a session can access a resource.

In this description and in the following claims, "validation information" is defined as any information other than authentication information that is used to control access to a resource using the protocol. Validation information may include information that causes a session to be recognized as being in a particular validation state with respect to a resource. For example, validation information may be associated with a session that causes a validation module to recognize that the session is in a logged-out state with respect to a resource.

In this description and in the following claims, a "logical communication path" is defined as any communication path that may enable the transport of electronic data between two entities such as computer systems or modules. The actual physical representation of a communication path between two entities is not important and may change over time. A logical communication path may include portions of a system bus, a local area network, a wide area network, the Internet, combinations thereof, or portions of any other path that may facilitate the transport of electronic data. Logical communication paths may include hardwired links, wireless links, or a combination of hardwired links and wireless links. Logical communication paths may also include software or hardware modules that condition or format portions of data so as to make them accessible to components that implement the principles of the present invention. Such components may include, for example, proxies, routers, firewalls, or gateways. Logical communication paths may also include portions of a Virtual Private Network ("VPN").

In this description and in the following claims, a "stateless protocol" is defined as any protocol that transfers data without knowledge of previously transferred data. That is, each transaction that utilizes a stateless protocol is viewed as an independent transaction, which does not require context or memory of previous transactions. For example, a World Wide Web ("WWW") server that receives a current request to access a resource via HTTP does not require information from any previous requests when determining if access to the resource should be granted. HyperText Transfer Protocol ("HTTP"), Wireless Transfer Protocol ("WTP"), Wireless Access Protocol ("WAP"), and Session Initiation Protocol ("SIP") are some examples of stateless protocols.

In accordance with the present invention, browsers, access control applications, validation modules, and resources as well as associated program data, including cookies and statetables, may be stored and accessed from any of the computer-readable media associated with telephonic device 100. For example, portions of such modules and portions of associated program data may be included in operating system 113, application programs 114, program modules 115 and/or program data 116, for storage in memory 112. Portions of such modules and associated program data may also be stored in any of the physical storage media previously described. Execution of such modules may be performed in a distributed environment as previously described.

Figure 2:
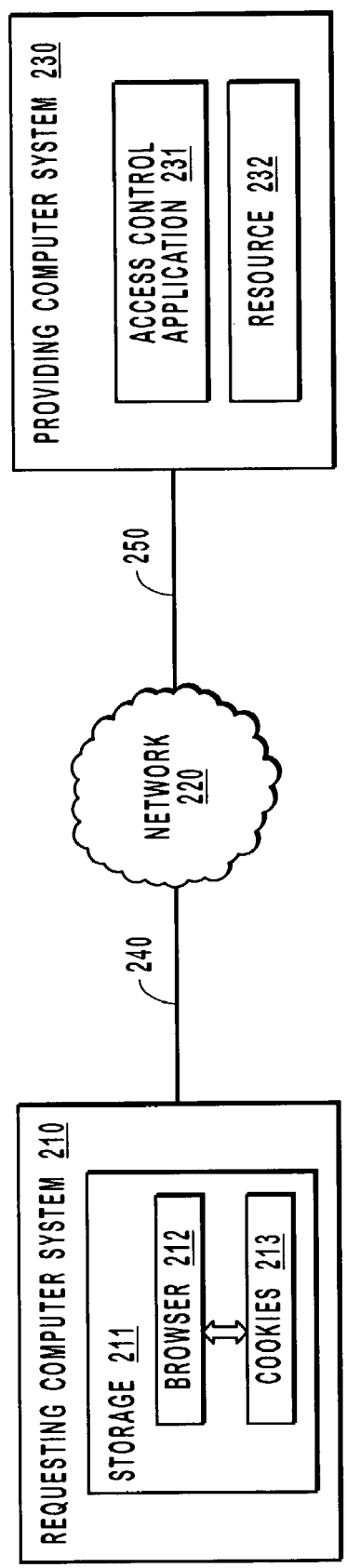
FIG. 2 illustrates an example of some of the functional components that may facilitate maintaining authentication states for resources accessed via stateless protocols.

FIG. 2 illustrates some of the functional components that may be used to facilitate maintaining states for resources accessed via stateless protocols. Shown in FIG. 2 are requesting computer system 210 and providing computer system 230. Each of the computer systems illustrated in FIG. 2 may be a general-purpose computer system that includes components similar to those previously discussed. The computer systems included in FIG. 2 may provide complex and flexible general-purpose processing capabilities.

Browser 212 and cookies 213 may be stored in storage 211. Storage 211 may be similar to memory 112 or may any other type of physical storage media. Browser 212 may include one or more modules that facilitate requesting access to resources included in providing computer systems. Browser 212 may send requests, via stateless protocols, such as, for example, HTTP, to access resources included in a providing computer system, such as providing computer system 230.

Browser 212 may utilize information included in cookies 213 when requesting access to the resources of providing computer system 230 or other providing computer systems. Browser 212 may also facilitate the presentation of accessed resources to the user of requesting computer system 210. This may include outputting accessed resources in a visual manner at a display similar to display 105 or in an audible manner at a speaker similar to speaker 104.

Access control application 231 and resource 232 may be included in providing computer system 230. Providing computer system 230 may receive requests via stateless protocols from requesting computer systems, such as requesting computer system 210. Access control application 231 may utilize authentication information and validation information associated with such requests to determine if access to a resource should be granted. If providing computer system 230 receives a request via HTTP (e.g., from requesting computer system 210), access control application 231 may utilize HTTP authentication information included in the request along with validation information when determining if access to resource 232 should be granted.

Also included in FIG. 2 is network 220. Network 220 may include portions of a local area network, a wide area network, the Internet, combinations thereof, or portions of any other networks that may facilitate the transport of electronic data. Network 220 may include hardwired links, wireless links, or a combination of hardwired links and wireless links. Network 220 may also include software or hardware modules that condition or format portions of data so as to make them accessible to components that implement the principles of the present invention. Such components may include, for example, proxies, routers, firewalls, or gateways. Network 220 may also include portions of a Virtual Private Network ("VPN"). As shown in FIG. 2, requesting computer system 210 communicates with network 220 via logical communication link 240 and providing computer system 230 communicates with network 220 via logical communication link 250.

FIG. 3A illustrates some of the functional components that may facilitate the execution of an express log-out command. Such a command may be used to cause a session associated with a resource to transition into a "logged-out" state with respect to the browser. As shown by arrow 1 in FIG. 3A, browser 312 may cause log-out module 332 to execute. This may cause a session on browser 312 to be "logged-out" with respect to resource 333. A session may be logged-out if a user of browser 312 selects a Uniform Resource Identifier ("URI") that causes log-out module 332 to execute. For example, if providing computer system 330 includes a Web server, the Web server may include a URI that, when selected, causes log-out module 332 to execute. Log-out module 332 may also be caused to execute if access control application 331 senses that a time stamped cookie or a usage stamped cookie associated with resource 333 has expired. Providing computer system 330 may receive information from a time stamped cookie or a usage stamped cookie in a request from requesting computer system 310.

FIG. 3B illustrates some of the functional components that may facilitate setting a log-out cookie. As shown by arrow 2 in FIG. 3B, access control application 331 sets log-out cookie 314. Log-out cookie 314 may include validation information associated with the state of resource 333 such as, for example, validation information that indicates resource 333 is in a logged-out state for a browser session. Validation information includes any information that may be processed by an access control application to determine a state of a resource. For example, validation information included in log-out cookie 314 may be processed by access control application 331 to determine the state of resource 333. Such validation information may indicate that a session associated with resource 333 is logged-out with respect to browser 312. In some embodiments, "validation begin" information may be used to indicate that a session associated with a resource is in a logged-out state.

If log-out module 332 is executed in response to a request from browser 312, the log-out cookie may be stored in a location accessible to browser 312. For example, as illustrated in FIG. 3B, log-out cookie 314 is included in cookies 313 and both browser 312 and cookies 313 are stored in storage 311.

Modules included in an access control application may refer to administrative rules associated with a resource when setting validation information. For example, log-out module 332 may refer to administrative rules associated with resource 333 when setting validation information in log-out cookie 314. Administrative rules may be hard-coded or may be user configurable through a user interface. For example, if providing computer system 330 operates in different network environments, a user may configure one or more administrative rules to designate different validation information for each different network environment. When log-out module 332 executes, it may refer to the one or more administrative rules and include designated validation information in log-out cookie 314.

Validation information may be in the form of electronic text that is encoded in a particular character set. Encoding electronic text involves assigning each character a unique numeric value. When a computer system interprets a numeric value associated with a specific character, it knows it is performing operations on the associated character. For instance, the character "a" may be represented by the hexadecimal value 61. If a computer system is performing character operations and receives a hexadecimal value of 61, the computer system will know it is performing an operation on the letter "a."

Electronic text may be encoded using virtually any technique that corresponds a numeric value to the representation of a text character. However, some encoding techniques are more common. The American Standard Code for Information Exchange ("ASCII") character set is a code for representing English characters, with each letter assigned a number between 0 and 127. The ISO Latin 1 character set is a superset of the ASCII character set, with each letter assigned a number between 0 and 255. Having more numbers available for assignment increases the number of different characters available to a user of a character set. This may allow a character set to include special symbols and may allow one character set to be used between different languages.

The ANSI character set is a collection of special characters and associated codes adopted by the American National Standards Institute. The ANSI character set includes characters for many different languages, special punctuation, and business symbols.

There are a number of character sets used to encode characters of the Japanese language. Many of these character sets are based on Japanese Industrial Standards and are identified by a code starting with "JIS," such as, for example, JIS X 0208-1990.

Unicode is a standard for representing characters, which may assign more than 65,000 unique characters. Unicode was developed to promote interoperability between programs and platforms that may currently be using differing encoding techniques. There is a risk when using different encoding techniques that the same number may represent different characters or that different numbers may represent the same character. Since Unicode may represent over 65,000 unique characters all the characters of most languages, including Greek, Chinese, and Japanese, may be included in one character set.

A transfer encoding is a scheme for representing the numeric values of a character set for a particular mode of transmission. It may be that a character set includes numeric values that are stored in a first larger format, for example, as 16-bit values, but that are to be transmitted in a data stream of a second smaller format, for example, 8-bits. Thus, numeric values of the character set must be reformatted, or "encoded for transfer", so that they are compatible with the second smaller format. For example, 16-bit Unicode values may need to be encoded for transfer before they can be placed in 7-bit or 8-bit data stream associated with the World Wide Web.

Encoding characters of a character set for transfer may be performed using a wide variety of techniques. Some transfer encoding techniques are specifically used to encode Japanese characters for transfer, such as, for example, ISO-2022-JP (JIS) encoding, EUC-JP encoding, and Shift-JIS encoding. Through the use of Japanese character sets and corresponding transfer encoding schemes, characters of the Japanese language may be transferred between networked computer systems, such as, for example, between a providing computer system and a requesting computer system on the World Wide Web.

In the description and following claims reference may be made to electronic text and the transfer of electronic text. It should be understood that the previously described text encoding techniques and transfer encoding techniques are merely examples. The present invention is not limited to these described text encoding techniques or described transfer encoding techniques. It would be apparent to one skilled in the art, after having reviewed this description, that a wide variety of text encoding techniques and transfer encoding techniques, in addition to those previously described, may be used to implement the principles of the present invention In some embodiments, validation information may include a single character of electronic text. For example, a single character of electronic text may be included in log-out cookie 314. The single character of text may be processed by access control application 331 to determine that a session associated with resource 333 is in a logged-out state with respect to browser 312. In other embodiments, validation information may include more than a single character of text. Validation information may be utilized to transition a session associated with a resource to a logged-out state or to a logged-in state. However, as validation information is entirely extensible, that is the number and arrangement of characters that may be included in validation information is virtually limitless, the states of a resource need not be restricted to a logged-in and logged-out state.

Figure 4A:
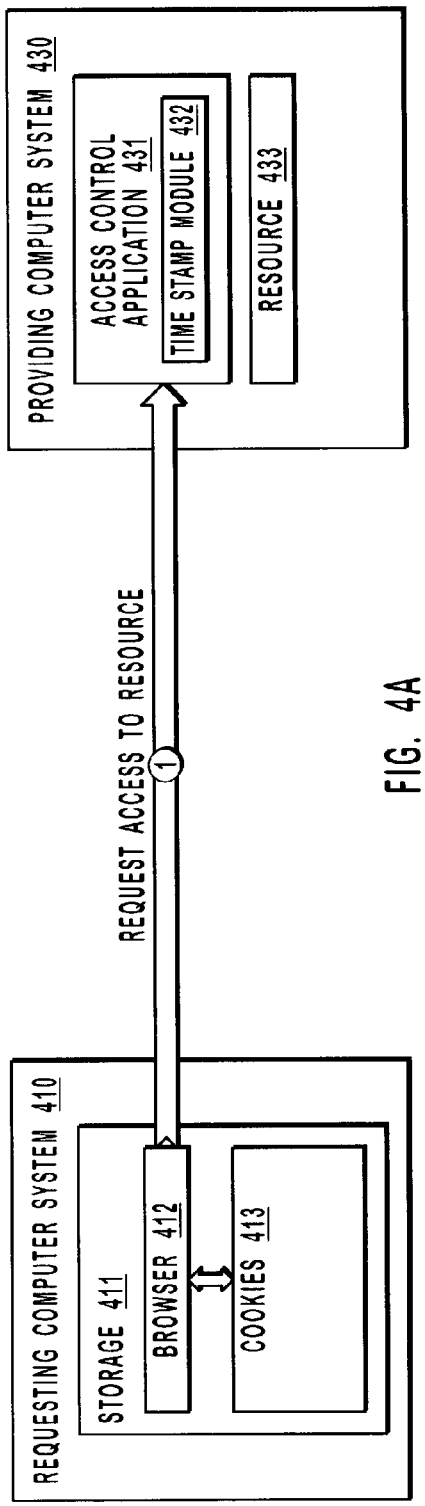
FIG. 4A illustrates an example of some of the functional components that may facilitate requesting access to a resource.

FIG. 4A illustrates some of the functional components that may facilitate requesting access to a resource. As shown by arrow 1 in FIG. 4A, browser 412 requests access to resource 433. Such a request by browser 412 may include sending an authentication header, for example, a "WWW-Authenticate" header. Access control application 431 may process authentication information included in an authentication header to determine if the authentication information is appropriate for accessing resource 433. Access control application 431 may also process validation information to determine the state of a session requesting access to resource 433 with respect to browser 412.

Figure 4B:
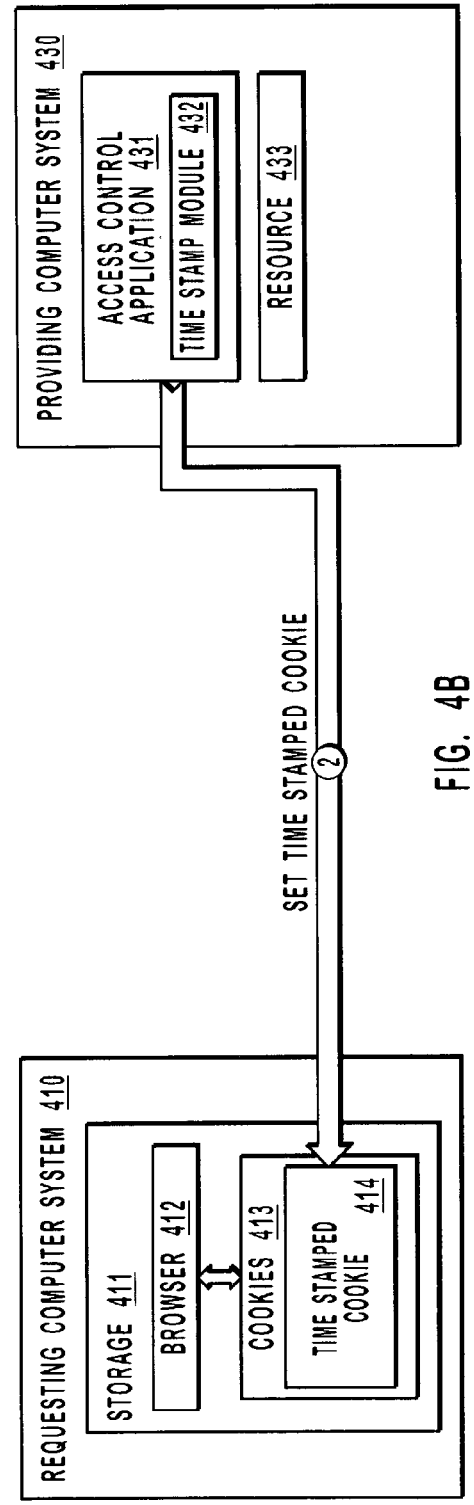
FIG. 4B illustrates an example of some of the functional components that may facilitate setting a time stamped cookie.

FIG. 4B illustrates some of the functional components that may facilitate setting a time stamped cookie. As shown by arrow 2 in FIG. 4B, access control application 431 sets time stamped cookie 414. Time stamped cookie 414 may include validation information indicating the state of a session associated with resource 433. A time stamp module may cause a time stamped cookie to be set when a request (e.g. an HTTP request) to access a resource is granted (or denied). For example, time stamp module 432 may cause time stamped cookie 414 to be set when access control application 431 grants access to resource 433.

If time stamp module 432 is executed in response to a request from browser 412, the time stamped cookie may be stored in a location accessible to browser 412. For example, as illustrated in FIG. 4B, time stamp cookie 414 is included in cookies 413 and both browser 412 and cookies 413 are stored in storage 411.

Time stamp module 432 may refer to administrative rules associated with resource 433 when setting validation information in time stamp cookie 414. Such administrative rules may designate an amount of time a session associated with resource 433 is in a logged-in state with respect to browser 412. Administrative rules may cause one or more time parameters to be included in validation information. The text "T=<time value>" may be included in validation information. In such validation information, "T" may be a parameter representing a time at which the logged-in state of a resource should expire and "<time value>" is the value of the parameter.

Time parameters may be set according to the system time of a providing computer system. For example, if the system time of providing computer system 430 is 9:00:00 on Nov. 1, 2001 and a two hour expiration time is desired, the validation information "T=11:00:00 11/1/2001" may be included in time stamp cookie 414. Alternately, a login time and expiration time may be included in validation information. For example, the validation information "login T=9:00:00 11/1/2001 expire T=11:00:00 11/1/2001" may be included in time stamp cookie 414. In such validation information, the text "login" may indicate that the subsequent T parameter is the time a resource was placed in a logged-in state and the text "expire" may indicate that the subsequent T parameter is a time the logged-in state should expire. Time parameters may also be increments of time, such as hours, minutes, or seconds. For example, the validation information "T=2" may be included in time stamp cookie 414. In such validation information, the text "T=2" may indicate the logged-in state of a resource should expire two hours from the time the logged-in state began. Incremental time parameters may be combined with absolute time parameters. For example, the validation information "login T=9:00:00 11/1/2001 expire T=2" may be included in time stamp cookie 414. In such validation information, the text "expire T=2" may indicate that a logged-in state should expire in two hours after 9:00:00 11/1/2001.

In some embodiments, a usage stamp module included in an access control application may refer to administrative rules associated with a resource when setting validation information in usage stamped cookie. Such administrative rules may designate a number of times a resource may be accessed by a browser before a logged-in state expires. For example, a usage stamp module (not shown) included in access control application 431 may refer to administrative rules that designate the number of times browser 412 may access resource 433 before a logged-in state expires. Administrative rules may cause one or more usage parameters to be included in validation information. For example, the text "N=<number>" may be included in validation information. In such validation information, "N" may be a parameter representing the number of times a resource may be accessed before a logged-in state of the resource should expire and "<number>" is the value of the parameter.

Although the previous described parameters are illustrated using characters of the English language, characters of other languages, such as, for example, Japanese, may be included in parameters of time stamped or usage stamped cookies.

Combinations of parameters may also be included in validation information. For example, validation information may indicate that access to a resource is to expire in thirty minutes or after the resource has been accessed five times.

It should be understood that these are only examples of parameters that may be included in validation information. It would be apparent to one skilled in the art, after having reviewed this description, that a wide variety of parameters may be included in validation information to aid in determining the state of a resource.

Figure 5:
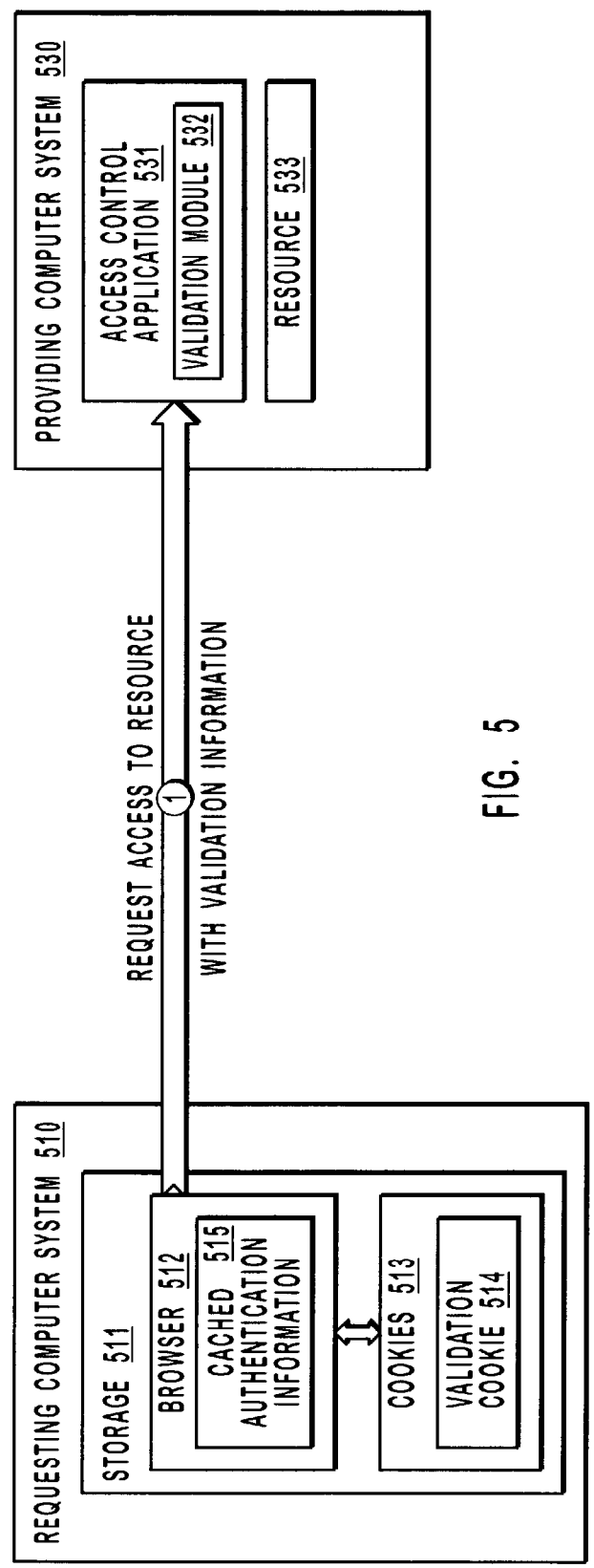
FIG. 5 illustrates an example of some of the functional components that may utilize validation information when determining if access to resource should be granted.
Figure 8:
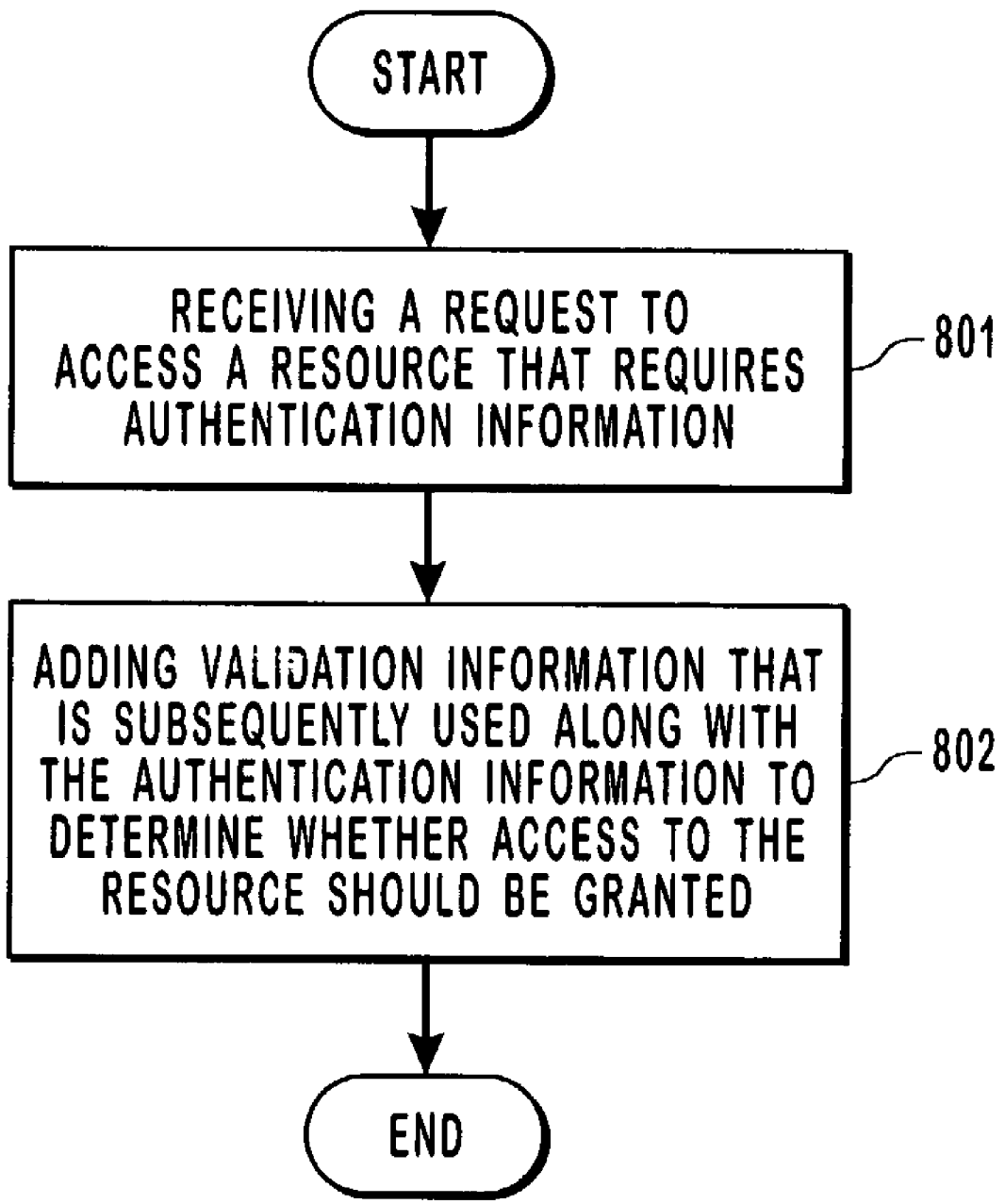
FIG. 8 is a flow diagram illustrating an example of a method for utilizing validation information when determining if access to resource should be granted.

FIG. 5 illustrates an example of some of the functional components that may utilize validation information when determining if access to resource should be granted. FIG. 8 is a flow diagram illustrating an example of a method for utilizing validation information when determining if access to a resource should be granted. The method in FIG. 8 will be discussed with reference to the functional components included in FIG. 5.

The method in FIG. 8 may begin with the reception of a request to access a resource that requires authentication information (act 801). As shown by arrow 1 in FIG. 5, this may include access control application 531 receiving a request from browser 512. A request from browser 512 to access resource 533 may automatically include information that is stored in validation cookie 514. A request for information may also include authentication information that was cashed by browser 512 in cached authentication information 515. Thus, when browser 512 requests access to resource 533, authentication information may be automatically included in the request. In some cases, it may be that an authentication has not previously been cached. In these cases, manually entered authentication information may be included in a request.

Validation information may be added and subsequently used along with the authentication information to determine whether access to the resource should be granted (act 802). FIG. 10 is an example of a chart illustrating a relationship between authentication information and validation information. As shown in FIG. 10, access may be granted to a resource when a request includes appropriate authentication information and is associated with validation information indicative of a logged-in state. In accordance with FIG. 10, access control application 531 may process received authentication information to determine if the authentication information is appropriate for accessing resource 533. Likewise, validation module 532 may process validation information to determine if received authentication information is indicative of a logged-in state. Thus, if authentication information is appropriate for accessing resource 533 and validation information indicates that a session associated with resource 533 is in a logged-in state, access to resource 533 may be granted.

Validation information may be associated with a request to access a resource by being included in a cookie associated with the resource. Shown in FIG. 5 is validation cookie 514, which may include validation information indicating the state of resource 533 with respect to browser 512. That is, such validation information may indicate that a session associated with resource 533 is in a logged-in state or in a logged-out state with respect to browser 512.

In some embodiments, validation information associated with a resource may be included in a state table that is indexed via a cookie identifier. When a request to access a resource is received, the state table may provide validation information indicative of the state of a resource. For example, if access control application 531 receives a request to access resource 533, validation module 532 may refer to a an indexed entry in a state table to determine whether a session associated with resource 533 is on a logged-in or logged-out state.

Figure 6A:
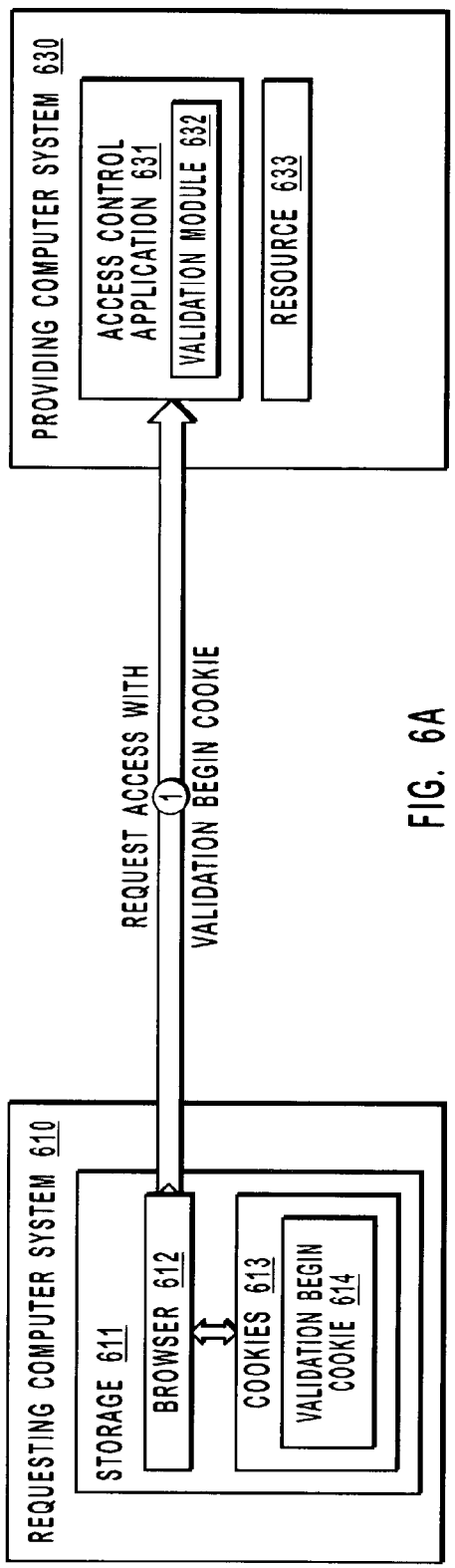
FIG. 6A illustrates an example of some of the functional components that may facilitate requesting access to a resource with a validation begin cookie.
Figure 6B:
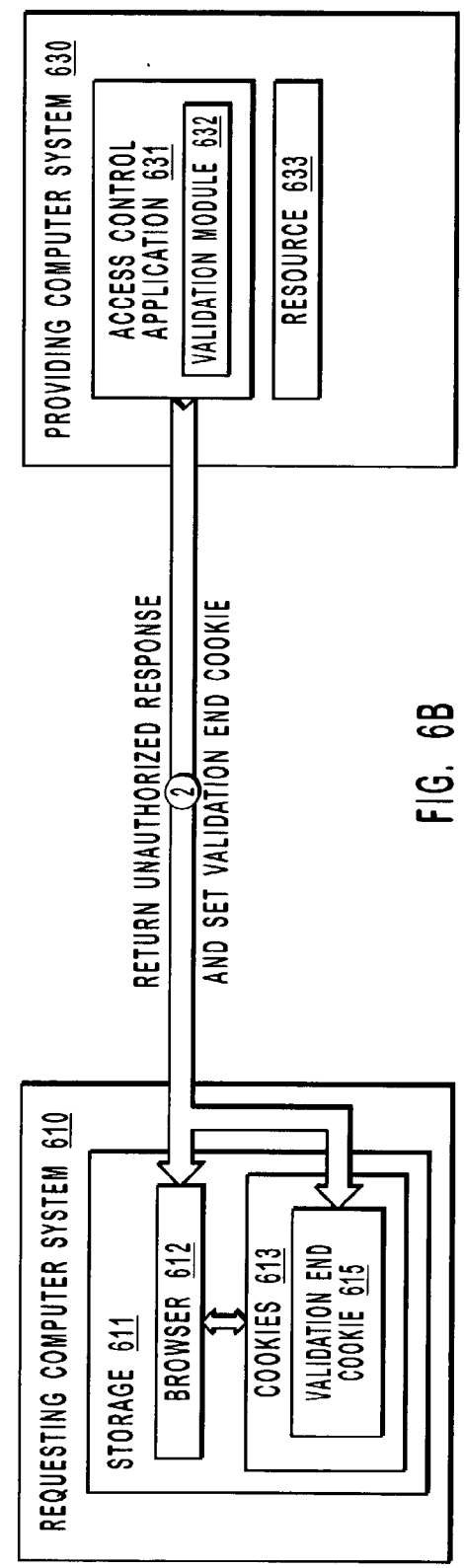
FIG. 6B illustrates an example of some of the functional components that may facilitate returning an unauthorized response and setting a validation end cookie.
Figure 6C:
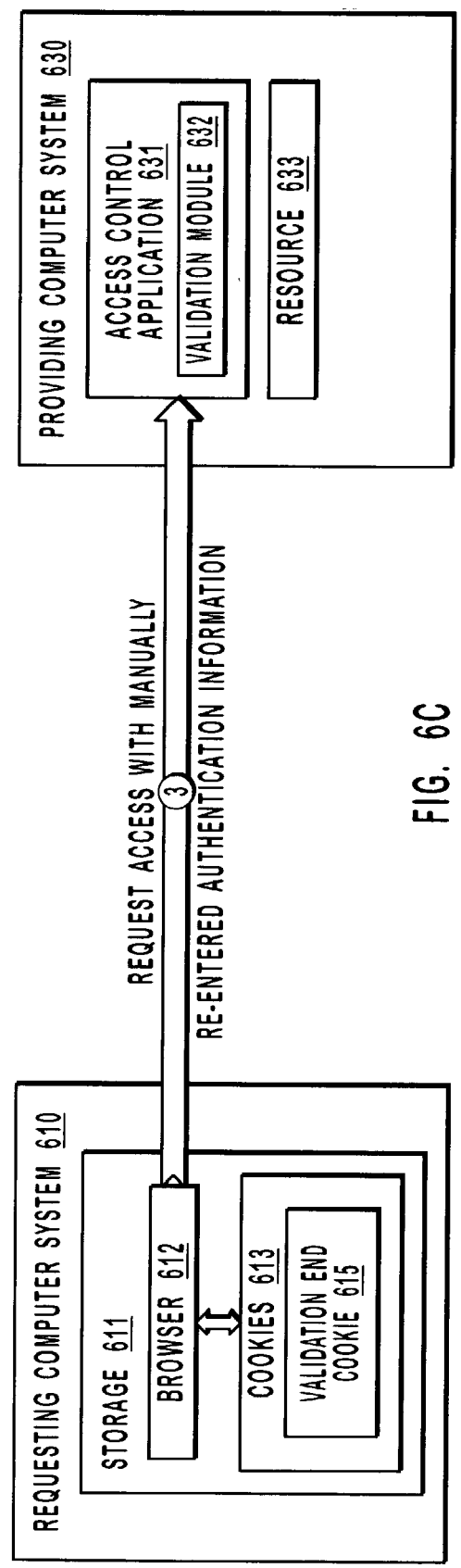
FIG. 6C illustrates an example of some of the functional components that may facilitate requesting access to a resource with manually entered authentication information.
Figure 9:
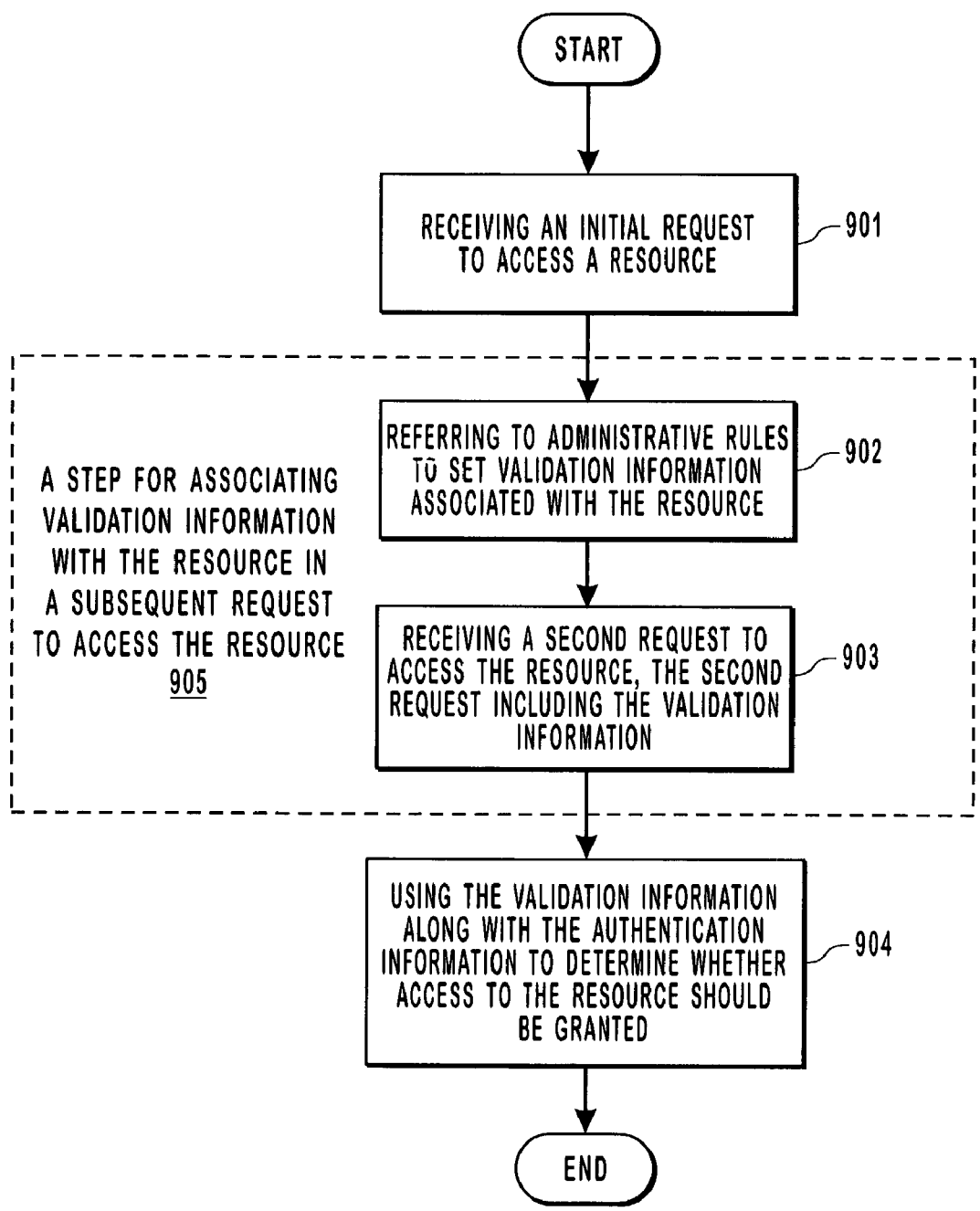
FIG. 9 is a flow diagram illustrating an example of a method for utilizing validation information in a manner that increases the chance of authentication information being manually entered.

FIG. 9 is a flow diagram illustrating an example of a method for utilizing validation information in a manner that increases the chance of authentication information being manually re-entered. FIGS. 6A, 6B, and 6C illustrate some of the functional components that may facilitate increasing the chance of authentication information being manually re-entered. The method in FIG. 9 will be discussed with reference to the functional components included in FIGS. 6A, 6B, and 6C.

The method in FIG. 9 may begin with receiving an initial request to access a resource (901). As shown by arrow 1 in FIG. 6A, this may include access control application 631 receiving a request from browser 612. Such a request may include authentication information (e.g. authentication information previously cached in memory by browser 612), as well as, validation information from validation begin cookie 614. Access control application may process the authentication information to determine if the authentication information is appropriate. Likewise, validation module 632 may process the validation information from validation begin cookie 614 to determine the state of resource 633. In some embodiments, validation module 632 may access validation information for a session associated with resource 633 from a state-table.

The method in FIG. 9 may include a step for associating validation information with the resource in a subsequent request to access the resource (step 905). This may include validation module 632 determining that a session associated with resource 633 is not in a logged-in state. In some embodiments, validation begin cookie 614 may be a log-out cookie that includes validation information indicating that a session associated with resource 633 is in a logged-out state. When validation information indicative of a logged-out state is received at validation module 632, validation module 632 may cause access control application 632 to reject a request.

In some embodiments, validation module 632 may access validation information from a state table that indicates a session associated with resource 633 is in a logged-out state.

Likewise, in some embodiments, validation begin cookie 614 may be a time stamped cookie, similar to time stamped cookie 414, or a usage stamped cookie. As such, validation begin cookie 614 may include validation information indicating that a session's access to resource 633 has expired. When validation module 632 receives information from a time stamped or usage stamped cookie, validation module 632 may make comparisons to determine if access to a resource has expired. This may include comparing parameters that are included in validation information to other parameters included in the validation information or to parameters of a providing computer system. For example, validation module 632 may perform comparisons on time parameters included in the validation information "login T=9:00:00 11/1/2001 expire T=2" to determine if it is two hours later than 9:00:00 11/1/2001. Comparing parameters may also include comparing usage parameters. For example, validation module 632 may perform comparisons on usage parameters included in the validation information "N=3" to determine if a resource has already been accessed three times. If a session's access to a resource expires due to time or usage, validation module 632 may view the session as if the session is in a logged-out state.

In some embodiments, validation module 632 may compare time and usage parameters that were accessed from a state-table.

It should be understood that these are only examples of the types of comparisons that may occur when determining the state of a resource. It would be apparent to one skilled in the art, after having reviewed this description, that a wide variety of comparisons may occur when determining the state of a resource.

Referring more specifically to FIG. 6B, if validation module 632 determines that a session associated with resource 633 is in a logged-out state with respect to browser 612, validation module 632 may cause one or more processing functions to occur. Validation module 632 may cause browser 612's request to access resource 633 to be rejected. As shown by arrow 2 in FIG. 6B, validation module 632 may also cause an unauthorized response to be sent to browser 612. If messaging is performed using HTTP this may include a "401 Unauthorized" response.

Also shown by arrow 2 in FIG. 6B, validation module 632 may set validation end cookie 615 in cookies 613. This may be included in step 905 as a corresponding act of referring to administrative rules to set validation information associated with a resource (act 902). That is, validation module 632 may refer to administrative rules when setting validation information in validation end cookie 615. Administrative rules may designate validation information that indicates browser 612 was returned an unauthorized message. Validation information included in validation end cookie 615 may be one or more characters of electronic text. As validation information is entirely extensible, the number and arrangement of characters that may be included in validation end cookie 615 is virtually limitless.

Step 905 may also include a corresponding act of receiving a second request to access the resource, which includes the validation information (act 903). This may include receiving validation information included in validation end cookie 615. As shown by arrow 3 in FIG. 6C, browser 612 may request access to resource 633 with manually re-entered authentication information. Validation information included in validation end cookie 615 may indicate that a request includes manually re-entered authentication information.

When a request to access a resource is rejected, an unauthorized message may be sent from the validation module to a requesting computer system signifying that the request is being rejected or that the user is unauthorized. The validation module may also send a form in which the user can re-enter their authentication information. Such a form may be under the control of a validation module (e.g. validation module 632). After sending this rejection message and receiving re-entered authentication information from a user, the validation module may update the session validation information in the cookie or associated with the cookie. In some embodiments, a validation module may compare credentials that are entered into a form to the credentials contained in a WWW-Authorization header of an HTTP request. This may relieve the validation module from having to contact an authentication database.

Validation information may be used along with authentication information to determine if access to the resource should be granted (act 904). This may include access control application 631 processing authentication information and validation module 632 processing validation information. In accordance with FIG. 10, access control application 631 may process received authentication information to determine if the authentication information is appropriate for accessing resource 633. Likewise, validation module 632 may process validation information to determine if received authentication information is associated with a session that is in a logged-in state. Thus, if authentication information is appropriate for accessing resource 633 and validation information indicates that a session associated with resource 633 is in a logged-in state, access to resource 633 may be granted.

It should be understood that changing the state of a session associated with a resource from a validation begin state to a validation end state is only an example of utilizing validation information to represent the state of a session. It would be apparent to one skilled in the art, after having reviewed this description, that validation information may be used to represent a wide variety of states for a session. Illustrated in FIG. 7 is an example of a state table that includes states that may be maintained for sessions associated with resources that are accessed via stateless protocols such as, for example, HTTP.

FIG. 7 shows three columns, "Entrance State", "Validation Module Action," and "Exit State." The Entrance State represents the state of a session before a request to access a resource is received. For example, when a session associated with a resource is logged-in, the resource may be considered to be in a valid state. The Validation Module Action represents the processing operations that are performed on a received request that includes validation information. For example, a validation module may process validation information from a log-out begin cookie to determine that a session associated with a resource is in a logged-out state. The Exit State represents the state of a session after a validation module has performed processing operation. For example, a validation module may process an expired cookie and transition a session from a logged-in to a logged-out state.

As shown in FIG. 7, the states of a resource may include NONE, VALID, VALIDATION BEGIN, and VALIDATION END. A NONE state may occur if a browser has never before requested access to a resource and thus the request is not associated with validation information. A validation module may view a NONE state as a logged-in state or a logged-out state depending on the configuration of the validation module. In response to receiving a request that is not associated with any validation information, a validation module may refer to administrative rules to set some validation information for a session. This may include setting validation information in a cookie or a state-table. A validation module may view a VALID state as a logged-in state. A validation module may admit a request to access a resource that is in a valid state.

If a validation module receives a request including an express log-out command or detects validation information indicating that access to a resource has expired, a validation module may set validation information indicative of a VALIDATION BEGIN state. A validation module may view a VALIDATION BEGIN state as a state where a session associated with a resource is in a logged-out state and/or authentication information is to be re-entered. If authentication information is received in a request that is subsequent to a validation module returning an unauthorized message to a browser, the validation module may set validation information indicative of a VALIDATION END state. A validation module may view a VALIDATION END state as a logged-in state.

Through the use of validation information, authentication states may be maintained for sessions associated with that accessed resources via stateless protocols. States may be maintained using techniques that are inherent to the stateless protocols. As a result, separate application level authentication infrastructures and propriety browser modifications are not needed. This reduces the programming resources needed to create modules that perform the functions of maintaining states and increases the chances of compatibility with existing operating systems.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

The invention claimed is:

1. In a computer system that is network connectable to a network and that may receive requests via stateless protocols, wherein received requests may be requests to access resources included in the computer system, a method for validating authentication information that is associated with a request to access a resource so as to determine the state of the resource, the method comprising:
   receiving a request via a stateless protocol to access a resource that requires authentication information inherent to access control mechanisms of the stateless protocol; and
   using the authentication information inherent to access control mechanisms of the stateless protocol and resource access requirements attributes for determining a session state for access to the resource;
   determining validation information, the validation information being distinct from the authentication information, the validation information containing information other than authentication information and the validation information incorporating the previously determined session state information, and wherein the validation information is subsequently used with the distinct authentication information to determine whether access to the resource should be granted;
   setting the validation information within the system requesting access to the resource;
   the requesting system sending the previously set validation information and sending the authentication information inherent to access control mechanisms of the stateless protocol with a subsequent request to access a resource included in the computer system;
   using the previously set validation information and the authentication information inherent to the stateless protocol's access control mechanisms to determine a session state; and
   using the validation information and the authentication information inherent to access control mechanisms of the stateless protocol to determine if access to the resource is to be granted whereby
      if and only if both the validation information is appropriate for accessing the resource and the authentication information is appropriate for accessing the resource, then access to the resource is granted, but if either the validation information is not appropriate for accessing the resource or if the authentication information is not appropriate for accessing the resource, then access to the resource is not granted.

2. The method as recited in claim 1, wherein receiving a request, via a stateless protocol, to access a resource that requires authentication information comprises the following:
   receiving an HTTP request to access a resource that requires authentication information.

3. The method as recited in claim 1, wherein receiving a request to access a resource that requires authentication information comprises the following:
   receiving a request that includes a WWW-Authenticate header.

4. The method as recited in claim 1, wherein receiving a request to access a resource that requires authentication information comprises the following:
   receiving a request that includes authentication information that was retrieved from a storage location.

5. The method as recited in claim 1, wherein receiving a request to access a resource that requires authentication information comprises the following:
   receiving a request that includes authentication information that was manually entered in response to a form being presented to a user.

6. The method as recited in claim 1, wherein receiving a request to access a resource that requires authentication information comprises the following:
   receiving a request to access a Web page that requires authentication information to access.

7. The method as recited in claim 1, wherein adding validation information that is subsequently used along with the authentication information to determine whether access to the resource should be granted comprises the following:
   adding validation information contained in a cookie that is subsequently used along with the authentication information.

8. The method as recited in claim 1, wherein adding validation information that is subsequently used along with the authentication information to determine whether access to the resource should be granted comprises the following:
   adding validation information contained in a state-table that is subsequently used along with the authentication information.

9. The method as recited in claim 1, wherein setting validation information that is subsequently used along with the authentication information to determine whether access to the resource should be granted comprises the following:
   setting validation information indicative of the validation state of the resource that is subsequently used along with the authentication information.

10. The method as recited in claim 1, wherein setting validation information that is subsequently used along with the authentication information to determine whether access to the resource should be granted comprises the following:
    setting validation information, which was caused to be set by the execution of an express log-out command, that is subsequently used along with the authentication information.

11. The method as recited in claim 1, wherein setting validation information that is subsequently used along with the authentication information to determine whether access to the resource should be granted comprises the following:
    setting validation information, which is indicative of access to the resource being expired, and is subsequently used along with the authentication information.

12. A method as recited in claim 1, the method further comprising the following:
- referring to administrative rules to determine validation information associated with the resource;
- receiving a second request to access the resource, the second request including the validation information; and
- using the validation information along with authentication information to determine whether access to the resource should be granted.

13. The method as recited in claim 12, wherein receiving an initial request to access the resource comprises the following:
- receiving a request to access a resource that is in a validation state.

14. The method as recited in claim 12, wherein receiving an initial request to access the resource comprises the following:
- receiving a request that includes authentication information that was cached to a memory location by a browser.

15. The method as recited in claim 12, wherein referring to administrative rules to set validation information associated with the resource comprises the following:
- rejecting the initial request and returning an unauthorized message.

16. The method as recited in claim 12, wherein referring to administrative rules to set validation information associated with the resource comprises the following:
- referring to administrative rules to determine validation information indicative of a validation state.

17. The method as recited in claim 13, wherein referring to administrative rules to set validation information associated with the resource comprises the following:
- referring to administrative rules to set a cookie with validation information.

18. The method as recited in claim 12, wherein referring to administrative rules to set validation information associated with the resource comprises the following:
- referring to administrative rules to set a state-table with validation information.

19. The method as recited in claim 12, wherein receiving a second request to access the resource, the second request including the validation information comprises the following:
- receiving a second request to access the resource that includes authentication information that was manually entered.

20. The method as recited in claim 12, wherein receiving a second request to access the resource, the second request including the validation information comprises the following:
- receiving a second request to access the resource that is associated with validation information contained in a cookie.

21. The method as recited in claim 12, wherein receiving a second request to access the resource the second request including the validation information comprises the following:
- receiving a second request to access the resource that is associated with validation information contained in a state-table.

22. The method as recited in claim 12, wherein receiving a second request to access the resource, the second request including the validation information comprises the following:
- receiving a second request to access the resource, the second request including the validation information indicative of the resource being in a validation begin state.

23. The method as recited in claim 12, wherein receiving a second request to access the resource, the second request including the validation information comprises the following:
- receiving a second request to access the resource, the second request including the validation information indicative of the resource being in a validation end state.

24. The method as recited in claim 12, wherein receiving a second request to access the resource, the second request including the validation information comprises the following:
- receiving a second request to access the resource, the second request including the validation information indicative of the resource being in a valid state.

25. The method as recited in claim 12, wherein receiving a second request to access the resource, the second request including the validation information comprises the following:
- receiving a second request to access the resource, the second request including the validation information indicative of the resource being in a logged-in state.

26. The method as recited in claim 12, wherein receiving a second request to access the resource, the second request including the validation information comprises the following:
- receiving a second request to access the resource, the second request including the validation information indicative of the resource being in a logged-out state.

27. The method as recited in claim 12, wherein receiving a second request to access the resource, the second request including the validation information comprises the following:
- receiving a second request to access the resource, the second request including the validation information indicating access to the resource has expired.

28. The method as recited in claim 12, wherein using the validation information along with authentication information to determine whether access to the resource should be granted comprises the following:
- using validation information contained in a cookie along with authentication information to determine whether access to the resource should be granted.

29. The method as recited in claim 12, wherein using the validation information along with authentication information to determine whether access to the resource should be granted comprises the following:
- using validation information contained in a state-table along with authentication information to determine whether access to the resource should be granted.

30. The method as recited in claim 12, wherein using the validation information along with authentication information to determine whether access to the resource should be granted comprises the following:
- using validation information along with authentication information that was manually entered to determine whether access to the resource should be granted.

31. The method as recited in claim 12, wherein request to access the resource are received via HTTP.

32. The method as recited in claim 12, further comprising:
- receiving a third request to access the resource that is associated with validation information indicative of a session associated with the resource being in a validation state that allows access to be granted to the resource.

33. A computer program product for use in a providing computer system that is network connectable to a network and that may receive requests via stateless protocols, wherein received requests may be requests to access resources included in the providing computer system, the computer program product for implementing a method for validating authentication information received in a request to access a resource so as to determine the state of the resource, the computer program product comprising the following:

one or more computer-readable storage media carrying computer-executable instructions, that when executed at the computer system, cause the computer system to perform the method for validating authentication information, wherein the method includes:

receiving a request via a stateless protocol to access a resource that requires authentication information inherent to access control mechanisms of the stateless protocol; and using the authentication information inherent to access control mechanisms of the stateless protocol and resource access requirements attributes for determining a session state for access to the resource;

determining validation information, the validation information being distinct from the authentication information, the validation information containing information other than authentication information and the validation information incorporating the previously determined session state information, and wherein the validation information is subsequently used with the distinct authentication information to determine whether access to the resource should be granted;

setting the validation information within the system requesting access to the resource;

the requesting system sending the previously set validation information and sending the authentication information inherent to the stateless protocol's access control mechanisms with a subsequent request to access a resource included in the computer system;

using the previously set validation information and the authentication information inherent to access control mechanisms of the stateless protocol to determine a session state; and using the validation information and the authentication information inherent to access control mechanisms of the stateless protocol to determine if access to the resource is to be granted whereby if and only if both the validation information is appropriate for accessing the resource and the authentication information is appropriate for accessing the resource, then access to the resource is granted, but if either the validation information is not appropriate for accessing the resource or if the authentication information is not appropriate for accessing the resource, then access to the resource is not granted.

34. The computer program product as recited claim 33, wherein the one or more computer-readable media include system memory.

* * * * *

UNITED STATES PATENT AND TRADEMARK OFFICE
CERTIFICATE OF CORRECTION

PATENT NO. : 7,421,730 B2
APPLICATION NO. : 10/142068
DATED : September 2, 2008
INVENTOR(S) : Dan E. Walther et al.

Page 1 of 1

It is certified that error appears in the above-identified patent and that said Letters Patent is hereby corrected as shown below:

In column 22, line 57, in Claim 31, delete "request" and insert -- requests --, therefor.

Signed and Sealed this
Third Day of May, 2011

David J. Kappos
*Director of the United States Patent and Trademark Office*